W. E. GILBERT.
INDICATING LAMP.
APPLICATION FILED DEC. 11, 1914.

1,133,126.

Patented Mar. 23, 1915.
2 SHEETS—SHEET 1.

Witnesses

Inventor
W. E. Gilbert,

Attorney

W. E. GILBERT.
INDICATING LAMP.
APPLICATION FILED DEC. 11, 1914.
1,133,126.
Patented Mar. 23, 1915.
2 SHEETS—SHEET 2.
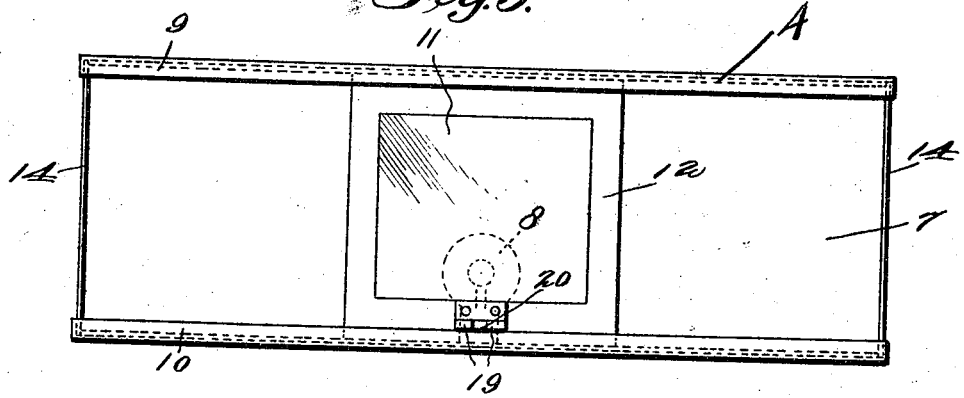
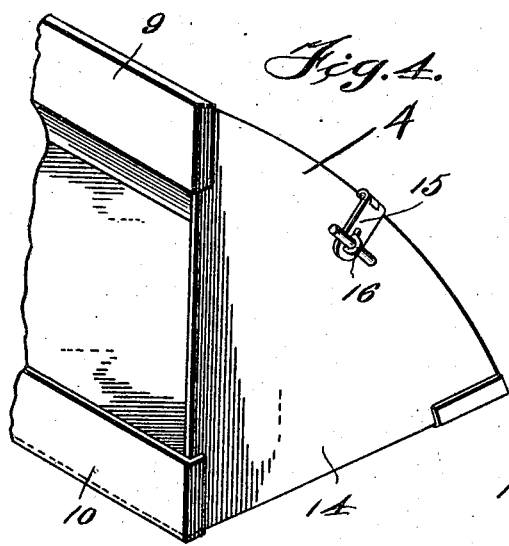
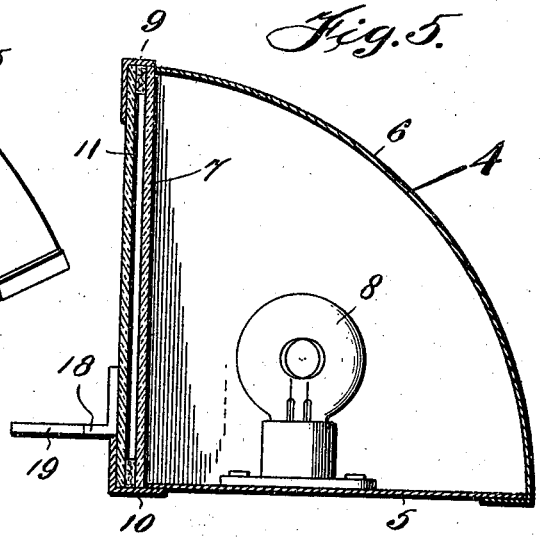
Witnesses
Inventor
W. E. Gilbert,
By
Attorney

UNITED STATES PATENT OFFICE.

WILLIAM E. GILBERT, OF WAKEFIELD, MICHIGAN.

INDICATING-LAMP.

1,133,126.

Specification of Letters Patent. Patented Mar. 23, 1915.

Application filed December 11, 1914. Serial No. 876,746.

*To all whom it may concern:*

Be it known that I, WILLIAM E. GILBERT, a citizen of the United States, residing at Wakefield, in the county of Gogebic and State of Michigan, have invented certain new and useful Improvements in Indicating-Lamps; and I do hereby declare the following to be a full, clear, and exact description of the invention, such as will enable others skilled in the art to which it appertains to make and use the same.

This invention relates to signaling devices, and the primary object of the invention is to provide a signaling lamp for attachment to an automobile of the ordinary type, by means of which the direction in which the automobile intends to travel may be made known to pedestrians.

Another object of this invention is to provide a device as specified, which embodies a front and rear light for attachment to the automobile, which are connected to a suitable lever carried by the automobile body and positioned for access by a person riding upon the seat of the car, for the manipulation of the signaling mechanism for the light.

A still further object of this invention is to provide a light as specified, which embodies a slidable plate of colored transparent material which is applicable for movement before or in front of an electric or other suitable lighting device for indicating the direction in which the automobile is to turn.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawings wherein like characters, designate like or corresponding parts throughout the several views, and in which:—

Figure 1:
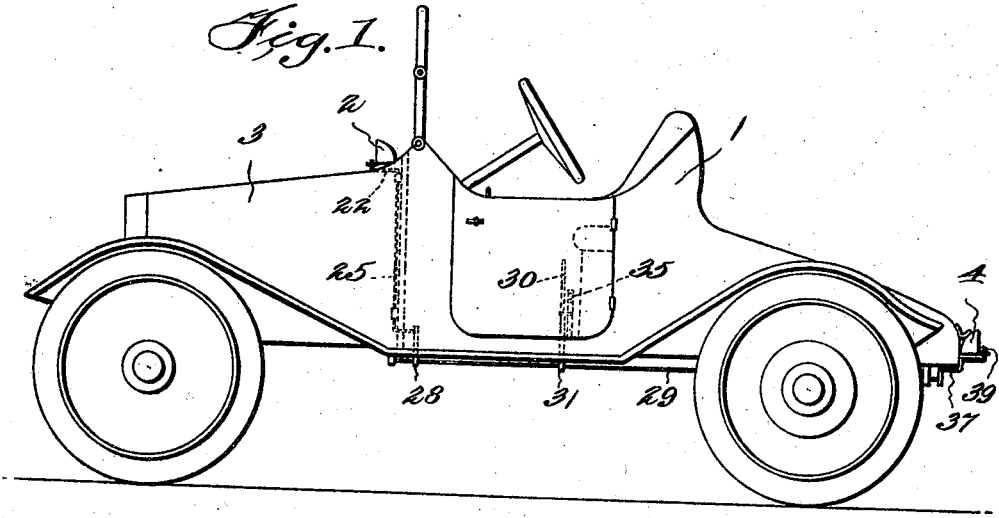
Figure 2:
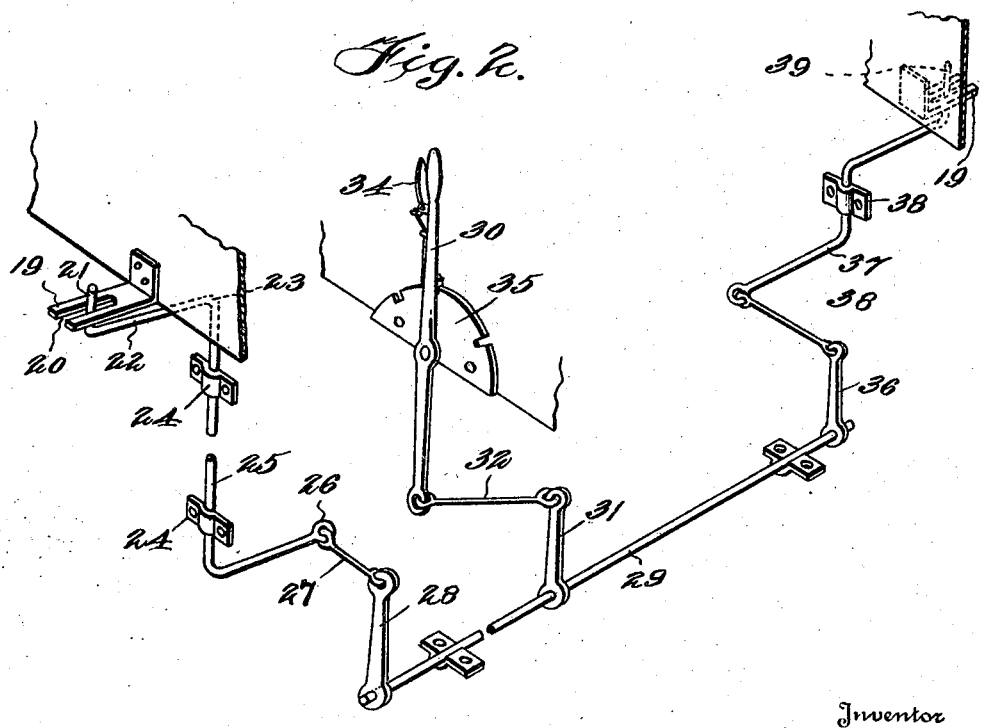

Figure 1 is a view of an automobile in side elevation showing the improved invention applied thereto. Fig. 2 is a detail perspective view of the connections for operating the signaling light mechanism. Fig. 3 is a front view of one of the signaling lamps. Fig. 4 is a detail perspective view of the end of the lamp cover, and Fig. 5 is a cross sectional view through the lamp and the housing therefor.

Referring more particularly to the drawings, 1 designates an automobile which is shown in the drawings as a roadster type, but it is to be understood that the invention may be applied to any suitable type of automobile now upon the market, without departing from the spirit of this invention.

The automobile body 1 has a lamp housing 2 mounted upon the cowl 3 thereof, and a second lamp housing 4 secured to the tail end of the machine. The lamp housings 2 and 4 are constructed of sheet metal, and they are shaped to form substantially one-quarter of a circle, having a horizontal base 5 an arcuate rear and upper wall 6, and a vertical forward wall 7. The vertical forward wall 7 is constructed of translucent material, such as frosted glass which is provided for the equal diffusing of the light generated by the lighting means 8 which is disposed within the housing 6. In the drawings, the lighting means 8 is shown as an incandescent electric light bulb, but if it is so desired any other suitable type of light generating means may be employed.

The casings or housings 2 and 4 have angle plates 9 and 10 secured to the upper and lower forward corners thereof, which plates project forwardly from the vertical translucent wall 7 and provide guide-ways for slidably retaining a transparent plate 11. The plate 11 is preferably constructed of red glass and has a border 12 about its marginal edge which is preferably painted white, so as to render a clear and distinct difference between the plate 11 and the translucent vertical wall 7 of the light housings 2 and 4. The arcuate rear walls of the housings 2 and 4 are hingedly connected to one of the vertical ends 14 thereof, and is held in a closed position by an ordinary hinged hasp 15, which is secured to the marginal edges of the arcuate rear walls, and coact with a staple 16 carried by one of the ends 14 of the housing.

The plates 11 have secured to the forward face thereof angle members 18, which have their horizontal arms 19 bifurcated as is shown at 20 in Fig. 2 of the drawings.

The housing 2 which is carried by the cowl 3 of the automobile 1 has the vertical end 21 of a rod 22 seated between the arms formed by the bifurcating of the horizontal arms 19 of the angle member 18 which is secured to the plate 11 carried thereby. The rod 22 is bent at 23, and extends downwardly vertically from the horizontal portion thereof and is rotatably carried by straps 24 which are secured to the body of the automobile in any suitable manner. The lower edge of the rod 22 is again bent angularly to the vertical section 25 thereof, and extends rearwardly therefrom having an eye 26 formed upon its terminal end. The eye 26 has a link 27 connected thereto, which link is in turn connected to an upstanding arm 28. The arm 28 is mounted upon the forward end of a rod 29 which extends along the under surface of the automobile body to the rear end of the same and is operatively connected to a hand lever 30 by an arm 31 and a link 32, so that upon the pivotal movement of the lever 30, the rod 29 will be rocked for rocking the arm 28 and moving the vertical upstanding upper end 21 of the rod 22 in an arc about the vertical section 25 of the rod as an axis, for sliding the plate 11 longitudinally along the front of the vertical translucent wall 7 of the housing.

The lever 30 has a dog mechanism 34 associated therewith which coacts with a quadrant 35, for holding the lever in various adjusted positions.

The rocking rod 29 extends beyond the rear end of the automobile body 1 and has an arm 36 connected to its outer end which extends upwardly therefrom. The arm 36 is connected to a rod 37 by a link 38. The rod 37 is rotatably carried by a strap 38 which is secured to the rear or tail end of the automobile body and which has its outer terminal end bent upwardly for forming a vertical section 39 which is seated between the arms formed by the bifurcation of the horizontal arm 19 of the angle bracket 18 which is secured to the plate 11 carried by the housing 4, so that the plate 11 carried by the housing 4 will be moved longitudinally along the front surface of the translucent vertical front wall 7 of the housing 4 upon the actuation of the lever 30.

The indicating or signaling light heretofore described are provided for indicating the direction of an automobile, when the same approaches a corner and such intentions of the car driver are made known by the sliding of the plate 11. During the day when the lights 8 are extinguished, the white border 12 which is about the plate 8 will cause the same to stand out clearly from the translucent back ground 7 so as to be easily distinguished by pedestrians. When the driver desires to turn to the left, he actuates the handle 30 to the left, which in turn causes the plate 11 to slide toward the left end of the housing 6, consequently indicating by means of the sliding of the plates 11 that he intends to turn toward the left. When his intentions are to turn to the right, he actuates the lever 30 toward the right which moves the plate 11 to the right end of the housing and thus makes known his intentions. If he is going straight ahead, the lever 30 is placed vertically, so that the plate 11 will rest in the center of the forward vertical translucent wall 7 of the housings 2 and 4, leaving an equal space upon each of the vertical side edges of the plate 11 thus indicating that he intends to go straight ahead.

At night, the plate 11 will be visible, owing to the fact that it is made of red or other colored glass and is easily distinguishable from the translucent background 7, which is preferably constructed of frosted glass.

From the foregoing description taken in connection with the accompanying drawings the advantages of construction and of the method of operation of the improved indicating lamp will be readily apparent to those skilled in the art to which this invention appertains and, while in the foregoing description, the principle of the operation of this invention has been described together with various features of construction, it is to be understood that certain minor features of construction, combination and arrangement of parts may be altered to suit practical conditions provided such alterations are comprehended within the scope of what is claimed.

What is claimed is:—

1. The combination with a vehicle, of a light retaining housing having a vertical front wall formed of translucent material, a light generating mechanism mounted within said housing, a plate of colored transparent material slidably carried by said housing in front of said vertical translucent wall, an angle plate connected to said slidable colored transparent plate and having a horizontal extending arm bifurcated and means connected to said bifurcated horizontal arm for moving said colored slidable plate at various positions in front of said translucent vertical wall.

2. The combination with a vehicle, of a light retaining housing carried thereby, a vertical front wall for said housing constructed of translucent material, light generating means carried by said housing, a plate of colored translucent material slidably carried by said housing in front of said translucent plate, said colored plate being shorter than said translucent front wall, an angle plate secured to said slidable colored plate, said angle plate having its horizontal arm bifurcated, a rod having one end thereof bent vertically and seated between the arm formed by the bifurcation of said horizontal arm, a rock rod connected to said first named rod, a lever connected to said rock rod for rocking the same for sliding said slidable plate into various positions in front of said translucent vertical wall.

3. The combination with a vehicle, of a light retaining housing carried thereby, a vertical front wall for said housing constructed of translucent material, light generating means carried by said housing, a plate of colored transparent material slidably carried by said housing in front of said translucent plate, said colored plate being shorter than said translucent front wall, an angle plate secured to said slidable colored plate, said angle plate having its horizontal arm bifurcated, a rod having one end thereof bent vertically and seated between the arm formed by the bifurcation of said horizontal arm, a rock rod connected to said first named rod, a lever connected to said rock rod for rocking the same for sliding said slidable plate into various positions in front of said translucent vertical wall, a second housing carried by the rear end of said vehicle body, a vertical translucent wall carried by said second housing, a plate slidably mounted in front of said translucent wall, and means connecting said slidable plate to said rock rod for rocking said slidable plate synchronously with the movement of said first mentioned slidable plate.

In testimony whereof I affix my signature in presence of two witnesses.

WILLIAM E. GILBERT.

Witnesses:
 ERNEST MILLER,
 JOHN OZZELLO.

Copies of this patent may be obtained for five cents each, by addressing the "Commissioner of Patents, Washington, D. C."